United States Patent [19]

Beck

[11] 4,222,193
[45] Sep. 16, 1980

[54] FISHING ROD CASE

[76] Inventor: Ronald A. Beck, 2331 W. 105th St., Bloomington, Minn. 55431

[21] Appl. No.: 29,888

[22] Filed: Apr. 13, 1979

[51] Int. Cl.³ .............................................. A01K 97/08
[52] U.S. Cl. .................................... 43/26; 150/52 R
[58] Field of Search .................... 43/26; 150/52 R; 206/315; 215/12 R; 264/DIG. 81

[56] References Cited

U.S. PATENT DOCUMENTS

| | | | |
|---|---|---|---|
| 764,398 | 7/1904 | Upton | 43/26 X |
| 1,986,256 | 1/1935 | Ellis | 150/52 |
| 2,197,977 | 4/1940 | Halpin . | |
| 2,595,746 | 5/1952 | Zinn | 43/26 |
| 2,618,880 | 11/1952 | Sourek . | |
| 2,723,482 | 11/1955 | Marten | 150/52 R X |
| 2,869,277 | 1/1959 | Breithaupt . | |
| 3,131,503 | 5/1964 | Gottula | 43/26 |
| 3,540,508 | 11/1970 | Couch | 150/52 R |
| 3,568,354 | 3/1971 | Yacko . | |
| 3,624,948 | 12/1971 | Baker | 43/26 |
| 3,632,714 | 1/1972 | Fairbanks | 264/DIG. 81 |
| 3,674,190 | 7/1972 | Wright . | |
| 3,972,144 | 8/1976 | Geisler . | |
| 4,136,478 | 1/1979 | Wycosky . | |

Primary Examiner—Nicholas P. Godici
Assistant Examiner—Robert P. Olszewski
Attorney, Agent, or Firm—Orrin M. Haugen; Thomas J. Nikolai

[57] ABSTRACT

A tubular case for a fishing rod which is formed from braided or pseudo-braided plastic filaments of an open, expandable weave, one end of the case being closed and provided with a loop member for facilitating the hanging thereof. The opposite end of the tubular case preferably has a flared opening to facilitate the insertion therein of the small, upper end of a fishing rod and its line guide. As the rod is forced into the sleeve, the sleeve expands so as to conform generally to the shape of the rod and its protuberances, i.e., line guides, bobbers, sinkers, and the like.

6 Claims, 5 Drawing Figures

FISHING ROD CASE

BACKGROUND OF THE INVENTION

I. Field of the Invention

This invention relates generally to an accessory for a fishing rod or pole, and more particularly to a protective cover for an assembled or disassembled fishing rod which facilitates the storage and carrying thereof.

II. Description of the Prior Art

Various forms of enclosures are known in the art for encasing fishing tackle. In certain prior art arrangements only the reel portion of the assembled rod and reel is enclosed as in the Wycosky U.S. Pat. No. 4,136,478 and the Breithhaupt U.S. Pat. No. 2,869,277. In other arrangements typified by the Wright U.S. Pat. No. 3,674,190 and the Geisler U.S. Pat. No. 3,972,144 both the rod and reel are enshrouded by an outer covering or case. Except for the above-mentioned Wright Patent, each of the cases described in the cited patents comprise a flexible cloth or fabric sack into which all or a portion of the fishing rod and reel combination may be inserted. In the Wright Patent, the casing is inflexible and includes a bottle-shaped portion for housing the reel ends of the assembled unit and an elongated tubular member surrounding the shafts of the enclosed fishing rods.

The casing devices represented by the above-mentioned patents suffer individually or cumulatively from a number of drawbacks. For example, the cases of the prior art tend to be somewhat bulky and include water absorbent materials which are difficult to dry once they become wet. Furthermore, the fabric type covers are subject to rot, mold or mildew and in some instances are costly to manufacture and must be tailored to fit specific sizes and types of rods.

SUMMARY OF THE INVENTION

The present invention is deemed to be an improvement over the prior art in that it results in a fishing tackle case which is extremely compact when not in use, is formed from non-absorbent materials which are generally unaffected by the elements, which is relatively inexpensive to manufacture and which fits a large variety of rod sizes and types.

In accordance with the teachings of the present invention, the fishing tackle case comprises an elongated, expandable, self-fitting tubular sleeve which is formed of braided plastic filaments, the braid being an open weave so as to be expandable and contractible, much like the commonly familiar "Chinese handcuffs" in principle. The braided plastic tubular member is of a length corresponding to the length of the fishing pole to be encased thereby and one end thereof is closed and provided with an open loop to facilitate hanging the case in a generally vertical orientation. The opposite end of the fishing tackle case has a flared opening to facilitate the insertion therein of an assembled rod. The tip of the rod and its line guide are inserted into this flared opening and the elongated braided plastic casing is pulled down over the rod assembly. Because of the expandable nature of the construction, the cover automatically expands to accommodate line guides of varying diameters while generally conforming to the overall configuration of the rod and accessories such as bobbers and sinkers which may be attached to the line.

Being fabricated from a suitable plastic such as nylon, polyethylene, etc. and because of its open weave, it does not retain water and may be shaken dry. Hence, the rod is protected from damage due to being encased in a damp environment. Also, its weave density allows the easy removal of a barbed fishing hook, should the hook become embedded within the sleeve, while still serving as an effective shield when carrying the rod and line through brushy areas.

The sleeve of the present invention is sufficiently flexible to permit it to be folded or rolled up into a small, compact configuration so that it may be easily transported in a tackle box, pocket or automobile glove compartment. The expandable braided sleeve is sufficiently tough and durable to protect the rod, line and line eyelets from cuts, scrapes and abrasions. Because of the manner in which the casing conforms to the shape of the rod, it prevents line tangles by holding the line and accessory items tightly against the assembled rod.

OBJECTS

It is accordingly the principal object of the present invention to provide a new and improved case for protecting and carrying a fishing rod assembly.

Another object of the invention is to provide an improved fishing rod case which is inexpensive to manufacture and which provides increased protection from damage not found in various prior art rod cases.

Yet another object of the invention is to provide a fishing rod case in the form of a hollow, braided mesh-like open weave sleeve which is closed at one end and opened at the other to permit the insertion of the rod therein.

These and other objects and advantages of the invention will become apparent to those skilled in the art from the following detailed description of the preferred embodiment when considered in conjunction with the accompanying drawings.

DESCRIPTION OF THE PREFERRED EMBODIMENT

Figure 1:
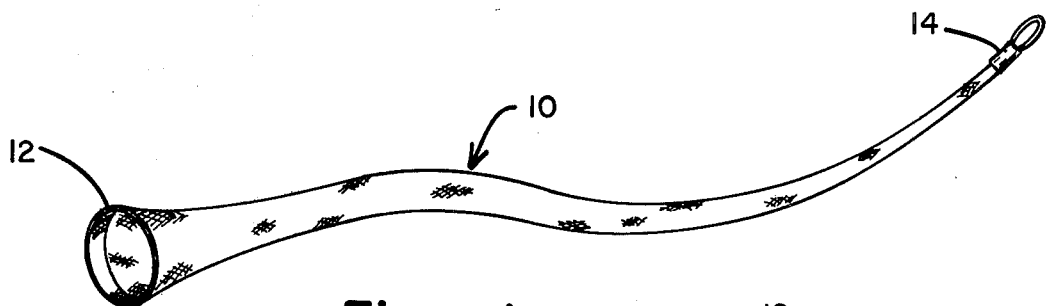
FIG. 1 is a perspective view of the preferred embodiment.

With reference to FIG. 1, there is shown a perspective view of the preferred embodiment. Specifically, the fishing pole cover of the present invention comprises an elongated, hollow, braided mesh tube indicated generally by numeral 10 which has a generally open end 12 and a closed end 14. The length of the braided member 10 is substantially equal to the length of the assembled fishing rod to be encased therein.

The expandable, self-fitting tubular sleeve member is preferably formed from a suitable plastic by braiding plastic filaments in a generally open weave and, in this regard, resembles the rather well-known "Chinese handcuffs" in the manner in which it can be made to retain a fishing rod inserted therein. This will be explained further in connection with FIG. 3 later on in this specification.

As mentioned, the sleeve member 10 is preferably woven from plastic filaments and it has been found that filaments made from nylon, polyvinyl chloride, polyethyleneteratylate and the like are highly suitable for the present application. Furthermore, the braided tubular sleeve may be woven from filaments which comprise a combination of the above-described materials.

The open end 12 is flared outwardly to define a "funnel mouth" which facilitates the insertion into the woven tubing of the outer end of a fishing pole. When the plastics mentioned above are employed as the filaments comprising the member, the flared open end 12 may be formed by turning inwardly upon itself, approximately ¼ inch to 1 inch of the braided sleeve and then stretching the material over a conical mandrel. Then, by applying heat as from a hot air gun, the material will take on a heat set corresponding to the shape of the mandrel. By utilizing this approach, the funnel thus formed conveniently slides over even the largest of line guides or eyes on a fishing rod and further prevents unraveling or unbraiding of the woven sleeve.

Figure 2:
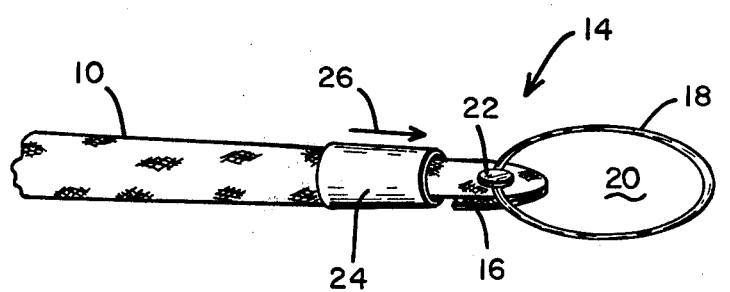
FIG. 2 is an enlarged view of the closed end portion of the embodiment of FIG. 1.

With reference to FIG. 2, an explanation will now be given as to the manner in which the closed end 14 of the fishing rod cover or case may be configured. FIG. 2 illustrates the arrangement at a stage prior to the completion of manufacture of the cover. Specifically, the end portion of the braided tubing is folded as at 16 and a flexible strap 18 is passed through the open weave of the sleeve 10 and formed into a loop 20 by securing the ends of the strap together by a suitable fastener 22. A short segment of heat shrinkable plastic tubing 24 is inserted over the loop in its expanded form so as to surround the braided member 10 as illustrated in FIG. 2. Next, the piece of tubing 24 is advanced in the direction of the arrow 26 so as to encase the folded end 16 of the braided member 10 as well as the fastener 22 which joins the ends of the flexible strap 18 together. Once so positioned, heat is applied to the heat shrinkable tubing 24 causing it to contract in a well known fashion so as to tightly bind the materials encased therein.

It has been found convenient to utilize a commercially available plastic tie member having serrated ratchet-like teeth on one end and a corresponding ratchet-like socket on its other end to form the loop 20. When the heat shrinkable tubing 24 is moved from the position shown in FIG. 2 so as to surround the junction between the strap ends and the folded portion of the braided cover member 10, a neat and structurally secure termination is made to the fishing rod cover which allows rather substantial forces in tension to be applied between the braided sheath and the loop 20 before separation can occur.

Figure 3:
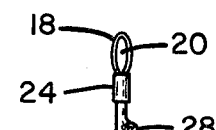
FIG. 3 is a view showing the casing surrounding an enclosed fishing rod assembly.

Referring next to FIG. 3, there is shown a side elevation view of the fishing rod case of the present invention when actually containing such a fishing rod assembly. Corresponding parts in the several views are identified by the same numeral. In use, then, the upper thin end of the fishing rod is inserted into the mouth portion 12 of the casing 10 and the sleeve portion is drawn down over the rod and its associated line guides or eyelets until reaching the end of the handle. Because of the self-fitting nature of the open weave employed in the fabrication of the tubular sleeve 10, the casing expands to fit over the protuberances as the sleeve is drawn downward over the rod. In FIG. 3, the bulges 28, 30 and 32 indicate the location of the guides on the fishing rod and while the bulge 34 illustrates the manner in which the expandable casing conforms to the hand grip and reel attaching portion of the rod assembly.

Figure 4:
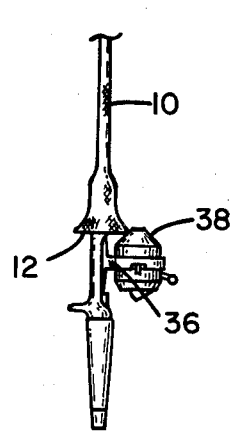
FIG. 4 is a partial view showing the manner in which the case may be used with a rod and reel combination.

In the view of FIG. 4, it is shown how the woven case of the present invention may be used to protect a fishing rod having a reel attached thereto. In this arrangement the sheath 10 is pulled onto the rod until its open, flared end 12 abuts the bracket 36 joining the reel 38 to the handle portion of the fishing pole.

Figure 5:
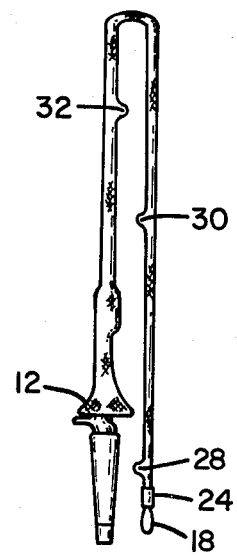
FIG. 5 illustrates the manner in which the preferred embodiment may be used with a disassembled, multipiece rod.

FIG. 5 is included to illustrate the manner in which a multi-segment fishing pole may be encased in the preferred embodiment. When the parts are disjointed within the case, the case may be folded between segments to provide a more compact arrangement.

The rod can easily be removed from the casing by grasping the handle of the fishing rod and applying a separating force between it and the braided casing 10. However, because of the fact that the braided casing conforms to the shape of the rod assembly contained therein, and because of the memory property of the filaments used in fabricating the braided tubular casing, the rod cannot fall out from the casing without the application of an external force over and above the force of gravity acting on it. Thus, the rod may be conveniently suspended from a hook or the like by positioning the loop 20 about the hook and letting the casing hand downward.

A product that has been found suitable for use as the braided casing 10 and which is commercially available is that sold under the trademark BEN-HAR EXPANDO by the Bentley-Harris Manufacturing Company of Lionville, Pa. This commercial product comprises a woven, braided sleeving for wrapping electrical cable and wiring harnesses. It is sold in continuous lengths and in differing diameters and colors. When cutting same to length for use as a fishing tackle casing, it has been found convenient to use a hot wire blade. When using such a blade, the adjacent braid ends fuse together upon cooling and prevent unraveling.

While the "Expando" material is altogether suitable for use in fabricating the fishing pole case of the present invention, another commercially available pseudo-woven plastic material which may be used in fabricating such a case by the HCM Corporation of Great Neck, N.Y. under the trademark POLY-NET. This material differs from the BEN-HAR EXPANDO material in that rather than being a truly woven or braided fabric, in POLY-NET the fibers are actually joined at their points of intersection. However, the Poly-Net material is considered to be a braided material within the meaning of the appended claims.

The fishing pole cover when manufactured in accordance with the teachings of the present invention can be used to contain a large range of pole-types and diameters. The sleeve material is sufficiently flexible to allow it to be rolled up for easy storage in a jacket pocket or tackle box. The material employed is sufficiently durable to afford protection to the rod, line and line eyelets from most impacts. Furthermore, the cover may be fabricated from filaments of differing colors and is considered to be quite attractive. Because of the material employed, the cover of the present invention will not absorb and retain water when immersed so that even if the cover should become wet during use, it will not retain this moisture. Hence, the cover can be reinstalled over the fishing rod and line accessories (i.e., bobbers, sinkers, etc.) without fear that moisture damage may occur to the fishing gear.

Perhaps one of the chief advantages of the cover arrangement of the present invention is that it is inexpensive to manufacture and therefore can be sold at a relatively modest price. The casing device will prevent line tangles from occurring due to loose or "blousing" leaders, swinging sinkers and the like. The self-cinching properties of the braided sleeving around the various protuberances on the rod permit the rod to be hung and stored in a vertical orientation without fear of its falling out of the case or the somewhat fragile rod tip being damaged.

Thus it can be seen that there has been provided by this invention an improved case or holder for a fishing rod assembly. Those reading the instant specification may conceive of various changes and modifications that may be made to it. Accordingly, the true spirit and scope of the invention is to be determined from the appended claims.

What is claimed is:

1. A flexible case for storing and protecting a fishing rod, comprising:
   (a) an elongated, conformable, tubular sleeve member formed of braided plastic filaments of a generally open weave, said tubular sleeve member having one open end and one generally closed end;
   (b) a loop member connected to said sleeve member proximate said closed end thereof; and
   (c) a shrinkable tube member disposed proximate said closed end of said sleeve and surrounding the connection between said loop member and said sleeve member.

2. The case as in claim 1 wherein said plastic filaments are formed from the class including nylon, polyvinyl chloride, polyethyleneteratylate, polypropylene, vinyl polyethylene or combinations thereof.

3. The case as in claim 1 wherein the length of said sleeve member is approximately the same as the length of the fishing rod to be encased therein.

4. The case as in claim 1 wherein said open end has an enlarged, generally flared, diameter compared to that of the remaining portion of said sleeve member.

5. The case as in claim 1 wherein the length of said sleeve member is such that when encasing a fishing rod and reel assembly said open end reaches to the connection between said rod and said reel.

6. The fishing rod case as in claim 1 wherein said sleeve member is generally flexible such that when separate segments of a multi-segment rod are disengaged, the case may be bent double at the location of the joint between said separate segments.

* * * * *